United States Patent [19] [11] Patent Number: 4,837,509
Dodmann et al. [45] Date of Patent: Jun. 6, 1989

[54] METHOD AND APPARATUS FOR MEASURING DIAMETER OF A STEEL REINFORCEMENT ROD EMBEDDED IN CONCRETE AND THE THICKNESS OF THE CONCRETE OVERLAYER

[75] Inventors: Gerd Dodmann, Dudweiler; Otto Kroggel; Jochen Fey, both of Darmstadt; Harald Kopp, Saarbrucken; Christoph Fritz, Darmstadt, all of Fed. Rep. of Germany

[73] Assignee: Fraunhofer-Gesellschaft zur Forderung der angewandten Forschung e.V., Munich, Fed. Rep. of Germany

[21] Appl. No.: 913,769

[22] Filed: Sep. 30, 1986

[30] Foreign Application Priority Data

Oct. 2, 1985 [DE] Fed. Rep. of Germany ....... 3535117

[51] Int. Cl.$^4$ ............... G01B 7/02; G01N 27/72; G01R 33/12
[52] U.S. Cl. .................... 324/207; 324/239; 324/227; 324/243; 324/234
[58] Field of Search ............... 324/207, 208, 225-230, 324/234, 235, 236, 239, 243, 262, 326-329, 345, 66, 67

[56] References Cited

U.S. PATENT DOCUMENTS

| 2,228,294 | 1/1941 | Wurzbach | 324/239 |
| 3,065,412 | 11/1962 | Rosenthal | 324/239 |
| 3,579,099 | 5/1971 | Kanbayashi | 324/235 |
| 4,096,437 | 6/1978 | Kitzinger et al. | 324/227 |
| 4,126,491 | 11/1978 | Karlsson | 324/238 X |
| 4,270,089 | 5/1981 | Haberlein | 324/262 |
| 4,270,888 | 5/1981 | Weischedel | 324/242 X |
| 4,434,659 | 3/1984 | Kurtz et al. | 324/262 X |
| 4,438,754 | 3/1984 | Nanny et al. | 324/226 X |
| 4,439,731 | 3/1984 | Harrison | 324/243 X |
| 4,468,620 | 8/1984 | Vaerman | 324/262 X |
| 4,485,344 | 11/1984 | de Sivry et al. | 324/207 |
| 4,495,465 | 1/1985 | Tomaiuolo et al. | 324/239 X |
| 4,510,447 | 4/1985 | Moyer | 324/262 X |
| 4,531,091 | 7/1985 | Kusenberger et al. | 324/242 |
| 4,573,013 | 2/1986 | Kusenberger | 324/235 X |
| 4,602,212 | 7/1986 | Hiroshima et al. | 324/232 X |

Primary Examiner—Reinhard J. Eisenzopf
Assistant Examiner—Warren S. Edmonds
Attorney, Agent, or Firm—Jeffers, Hoffman & Niewyk

[57] ABSTRACT

A method and apparatus for measuring the overlayer of a nonmagnetic material such as concrete and the diameter of steel reinforcement bars embedded therein. A steady state magnetic flux field is generated in the area of the concrete which is to be tested. A reinforcement bar embedded within the concrete generates a scatter field which is superimposed on the excitation field. By scanning the concrete surface, an amplitude locus is determined which is subtracted from an amplitude locus determined in the absence of ferromagnetic objects, whereby a difference locus is obtained. The concrete overlayer and the diameter of the steel reinforcement bar are determined from the location and magnitude of the maximum values of the difference locus with the aid of an evaluation computer.

13 Claims, 6 Drawing Sheets

METHOD AND APPARATUS FOR MEASURING DIAMETER OF A STEEL REINFORCEMENT ROD EMBEDDED IN CONCRETE AND THE THICKNESS OF THE CONCRETE OVERLAYER

BACKGROUND OF THE INVENTION

This invention relates to a method for measuring ferromagnetic objects embedded in nonmagnetic materials. More specifically the invention relates to a method for measuring the diameter of reinforcement steel embedded in concrete and the dimension of the concrete overlayer by measuring and evaluating the effect of the ferromagnetic objects on a magnetic field. The invention further relates to an apparatus for practicing the method.

European Patent No. EP-A1-0 080 676 describes a test instrument for determining the dimension of the concrete overlayer which makes it possible, in the inspection of steel-reinforced concrete structures or concrete components, to determine that the specifications for the concrete overlayer have been met. This prior art test instrument for measuring the concrete overlayer utilizes the attraction force of a permanent magnet or a permanent magnet system, which force varies as a function of the spacing from the ferromagnetic parts. However, this method requires initial calibration of the test instrument on a specified concrete overlayer. Therefore, the use of such prior art test instruments is inexact and results in significant measuring errors.

Prior art instruments based on the principle of attenuating a parallel oscillatory circuit have also been provided for measuring the concrete overlayer and for estimating the bar diameter. These instruments pass an alternating current of a specific frequency through the coil of a probe which produces a magnetic alternating field. Metallic objects located within the effective range of the alternating field cause a change of the coil voltage as a function of the dimension of the overlayer and bar diameters. Such a reinforcement instrument, described for instance in a brochure by Proceq S.A. of Zurich, Switzerland, results in significant measuring errors in the case of unknown bar diameters. It is also possible to measure the overlayer with the aid of magnetic resistance measurement, if the diameter of the steel reinforcement is known. An eddy current impedance measurement employing empiric calibration involves problems due to the large fluctuations of the permability of steel.

In view of this state of the prior art, it is an object of the present invention to provide a method and an apparatus to determine, in addition to the dimension of the overlayer, the diameter of the steel reinforcement without the need for a sample for calibration or comparison purposes.

SUMMARY OF THE INVENTION

The present invention overcomes the problems and disadvantages of the above described prior art measuring methods and apparatuses.

The method, according to the present invention, in one form thereof, compares the magnetic field generated between the pole shoes of a U-shaped electromagnet with the field between the pole shoes of the magnet when the magnet is passed along the surface of reinforced concrete material.

More specifically, the invention, in one form thereof, comprises:

placing a U-shaped magnet in sensing fashion on the surface of the material to be measured, such as, for instance, a concrete surface;

determining the amplitude locus of the normal component of the magnetic field between the poles of the magnet, oriented perpendicularly to the surface, along the surface of the material and storing this locus;

determining and storing the amplitude locus of the normal component of the magnetic field between the poles of the magnet in the absence of ferromagnetic objects;

storing a calibration curve which plots the excitation field strength between the poles as a function of the excitation current;

forming a difference locus from the two amplitude loci;

determining the center distance between the ferromagnetic object and the surface of the material from the spacing of the maximum values of the difference locus; and determining the diameter of the ferromagnetic object and thus also the distance the surface of the ferromagnetic object is spaced from the material surface from the spacing between the two maximum values of the difference locus, the amplitude of the magnetic field coordinated with one of the maximum values, and the excitation field strength at the location of the object as derived from the calibration curve.

An apparatus for the application of the method of the present invention, in one form thereof, comprises an excitation coil which carries direct current and which is mounted on a U-shaped magnet yoke. A sensing device for sensing the normal component of the magnetic field is located between the pole shoes of the magnet. The sensing device is connected to an evaluating device for evaluating the data generated by the sensor and for calculating and displaying the desired values.

BRIEF DESCRIPTION OF THE DRAWINGS

The above mentioned and other features and objects of the invention and the manner of attaining them, will become more apparent and the invention itself will be better understood by reference to the following description of an embodiment of the invention taken in conjunction with the accompanying drawings wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Figure 1:
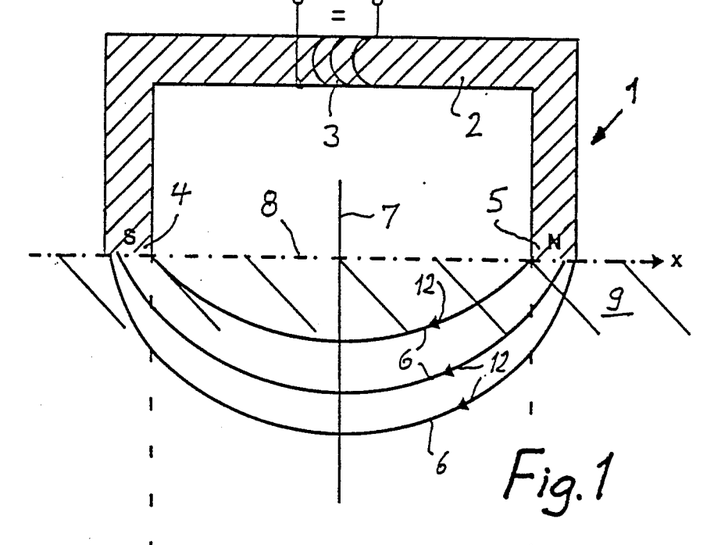
FIG. 1 is a diagrammatic cross sectional elevational view of an electro magnet according to the instant invention, located in situ, and of the magnetic flux field of the magnet in the absence of ferromagnetic objects.

FIG. 1 shows a schematic cross sectional view of an electromagnet 1 comprising a U-shaped yoke 2 on which an excitation coil 3 is wound which may be connected to a source of direct current.

When the excitation coil 3 has been connected to a supply of direct current (not illustrated), a magnetic field 6 shaped as a steady state magnetic flux field forms between pole shoes 4 and 5 of magnet 1. The location of the south pole, marked S in the drawing, and of the north pole, marked N, depends on the polarity of the direct voltage supply connected to excitation coil 3. For a fixed locus between pole shoes 4, 5, the magnetic field 6 increases linearly with the current which is conducted through excitation coil 3. The magnetic field 6 is locally inhomogeneous but is symmetric with regard to the axis of symmetry 7 of the yoke 2.

The pattern of the magnetic field 6 shown in FIG. 1 will not change when the magnet 1 is placed on the surface 8 of a concrete slab 9 which does not contain ferromagnetic objects, such as reinforcement bars or reinforcement steel. Thus, the pattern of the magnetic field 6 shown in FIG. 1 is the same in concrete and in air.

Figure 2:
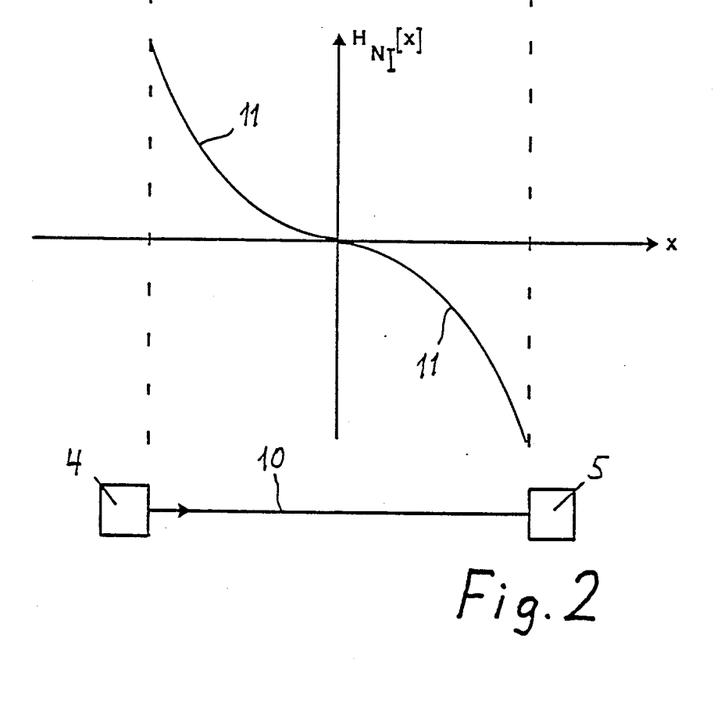
FIG. 2 is a plan view of the pole shoes for the magnet of FIG. 1, together with an amplitude locus for the flux field pattern.

FIG. 2 shows a plan view of the pole shoes 4,5 with a sensing path 10 extending in a straight line between pole shoes 4 and 5. When the locus coordinate X is assigned to the sensing path 10 located on the surface 8, the normal component of the magnetic field 6 which is perpendicularly oriented to the surface 8 is represented by the amplitude locus 11. The amplitude of the normal component is plotted as a function of x and is referenced $H_{NI}(x)$.

In FIG. 2, positive values of the normal component occur to the left of the symmetry axis 7 and negative values occur to the right of the symmetry axis 7, as referenced to the direction of arrows 12 shown in FIG. 1.

Figure 3:
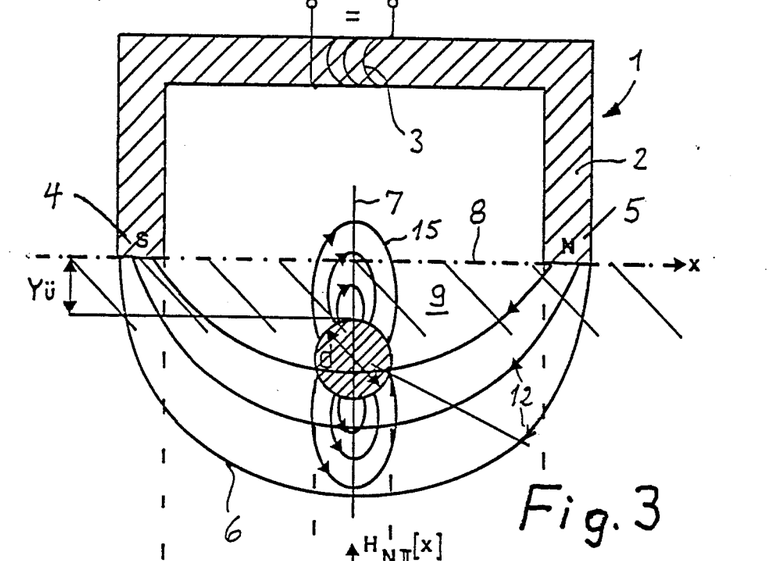
FIG. 3 is a view corresponding to FIG. 1, but with a reinforcement bar extending along the symmetry axis of the sensing magnet, and transverse to the flux field.

In FIG. 3, the components described in connection with FIG. 1 are referenced identically. Additionally, FIG. 3 shows a reinforcement bar 14 located beneath the surface 8 on the axis of symmetry 7. Reinforcement bar 14 has a diameter d as shown in FIG. 3.

When ferromagnetic reinforcement bar 14 is located in concrete 9 in the area of the magnetic field 6, as illustrated in FIG. 3, the bar 14 is exposed to flux components of magnetic field 6 which are perpendicular to the bar axis, and the ferromagnetic reinforcement bar 14 will react with a scatter field 15 of a field strength $H_s$ which is superimposed linearly on the magnetic field 6. The scatter field 15 has the characteristic of a dipole field, as clearly shown in FIG. 3.

Figure 4:
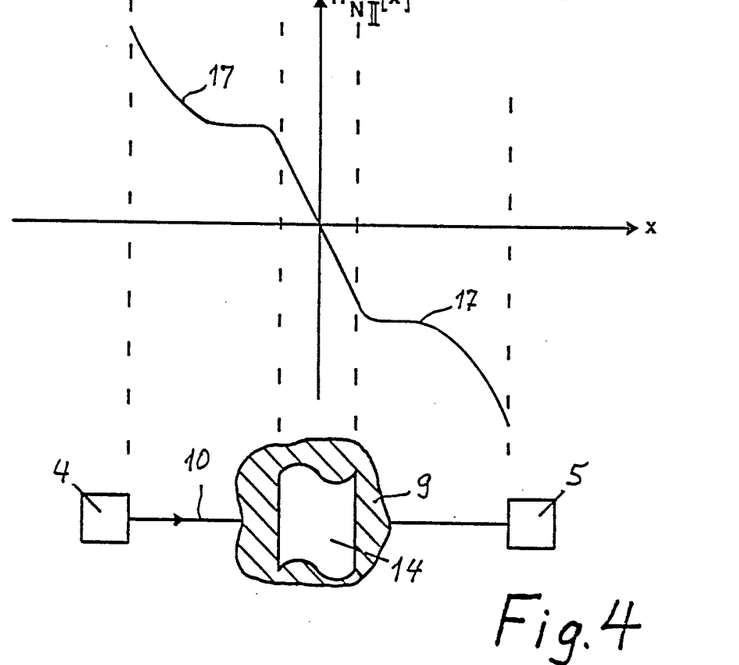
FIG. 4 is a view corresponding to FIG. 2 illustrating the deformation of the amplitude locus when a ferromagnetic object is introduced into the magnetic flux field.
Figure 7:
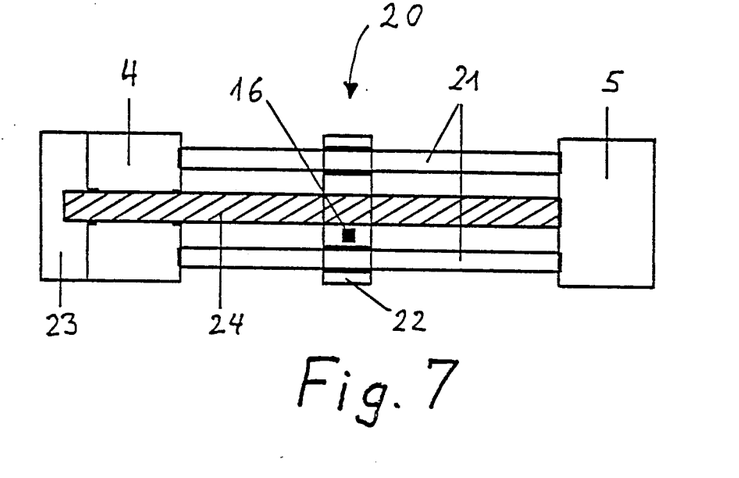
FIG. 7 is a plan view of a sensing device with a mechanically moveable magnet probe.

When a magnetic field probe 16, illustrated schematically in FIG. 7, is passed along the scanning path 10 shown in FIG. 4, between the pole shoes 4 and 5 on the surface of the concrete 9, so as to scan the overall field generated by superimposing the magnetic field 6 and the scatter field 15, the amplitude locus 17 of the normal component $H_{NII}(x)$ will be as shown in FIG. 4. The pattern of locus 17 resulting from the measuring operation II (FIG. 3) differs distinctly from the amplitude locus 11 which resulted from the measuring operation I (FIG. 1). The magnetic field probe 16 used for determining the superimposition of the exciting magnetic field 6 and the scatter field 15 may be a Hall effect probe which is so oriented that it will respond only to the normal component of the overall magnetic field.

Figure 5:
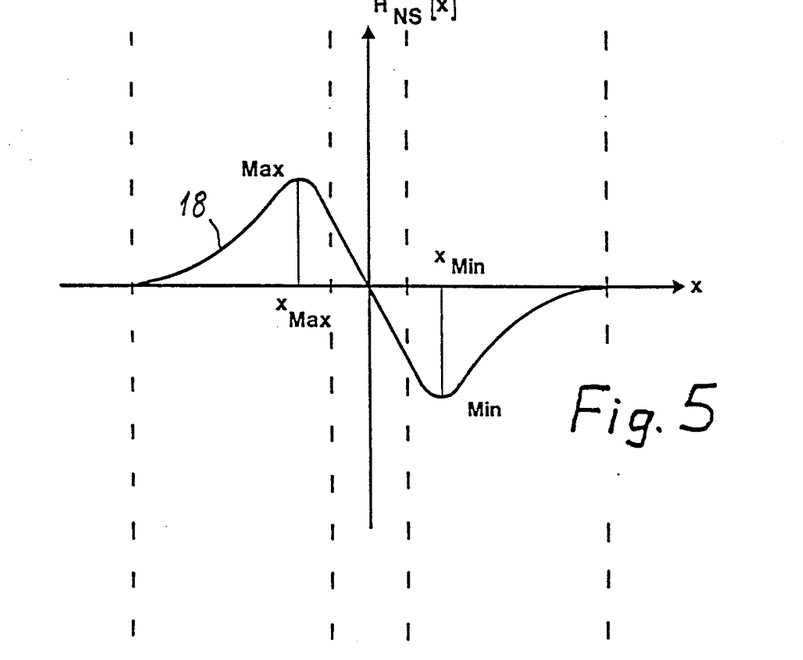
FIG. 5 shows a scatter field locus produced by a reinforcement steel bar.

FIG. 5 shows the amplitude locus $H_{NS}(x)$ of the scatter field 15 which is solely determined by the dimension Yü of concrete overlayer 9 shown in FIG. 3, by the diameter d of reinforcement bar 14, and by the excitation field strength H at the location of the reinforcement bar 14, i.e., at the distance (Yü+d/2) from the surface 8. The amplitude locus $H_{NS}(x)$ or scatter locus 18 will be termed the difference locus hereinafter, since it may be derived by determining the difference of the amplitude loci 17 and 11.

Figure 6:
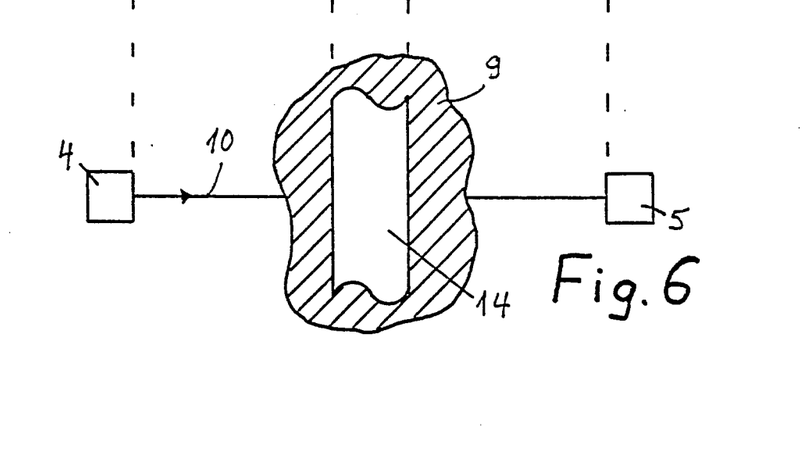
FIG. 6 shows a coordinated sensing path between the pole shoes of the magnet.

The coordination of the difference locus 18 with the reinforcement bar 14 embedded in the concrete 8 is illustrated in FIGS. 5 and 6.

The coordination of the difference locus 18 which represents the magnitude of the normal component of the magnetic field, with the diameter d of the reinforcement bar 14, derives from the spacing between the maximum value Max shown in FIG. 5 and the minimum value Min. shown as well in FIG. 5, of the difference locus 18 of the normal components. The locations of the maximum and minimum values Max. and Min. of the difference locus 18 are independent of on the amplitude H of the exciting magnetic field 6. If the distance between the maximum and minimum values measured along the x axis is defined as Delta x, the following relation is obtained for the distance of the center of the reinforcement bar 14 from the surface 8 of the concrete 9:

$$Yu + d/2 = \frac{\text{Delta } x \cdot 3^{\frac{1}{2}}}{2} \quad (1)$$

The following equation applies to the diameter d of the reinforcement bar 14:

$$d^2 = \frac{\text{Max} \cdot 8 \cdot (\text{Delta } x)^2}{H \cdot 3^{\frac{1}{2}}} \quad (2)$$

In this equation, H is the excitation field strength at the location of the reinforcement bar (Yü+d/2). The excitation field strength H is dependent on the magnet yoke geometry and must be determined in air for each magnet yoke being used and for each amplitude of the current in excitation coil 3 located on the axis of symmetry and any (Yü+d/2) distances to be tested. The field strength H may be represented by a calibration curve. The current I enters as a linear factor into the excitation field strength H.

Once the excitation field strength H for all distances of the center of the reinforcement bar 14 as measured along the axis of symmetry 7 in a set-up according to FIG. 1, have been stored in a calibration curve, the distance of the middle of the reinforcement bar from the surface of concrete, Yü+d/2, may be determined with the aid of equation (1) from Delta x. The value H of the excitation field strength coordinated with that distance may be inserted into equation (2), along with the maximum value Max and the value for Delta x, for determining $d^2$. The overlayer dimension Yü may then be directly derived from equations (2) and (1).

The above discussions show that with, a few operational steps, it is possible to measure both the unknown diameter d of reinforcement bars embedded in concrete and also the unknown thickness of a concrete overlayer, by determining and evaluating the influence of the ferromagnetic reinforcement steel on a steady state magnetic field. This determination requires sensing the surface 8 of the concrete to be examined with the magnet 1 described above. Thereafter, the amplitude locus 17 of the normal components of the magnetic field 6 which are oriented perpendicularly to the surface 8, are measured between the pole shoes 4 and 5 along the surface 8 and are stored. The amplitude locus 11 of the normal component of the magnetic field 6 between the pole shoes 4 and 5 of magnet 1 in the absence of ferromagnetic objects is measured and stored. The above described magnetic field probe 16 or Hall effect probe may be used for this measurement. Additionally, a calibration curve for the excitation field strength H between the pole shoes 4 and 5 as a function of the excitation current and the respective yoke geometry is determined and stored. The measured values are then evaluated by deriving the difference locus 18 from the amplitude loci 17 and 11 in order to determine from the distance between the two maximum values, termed Delta x, the distance of the center of the reinforcement bar from the surface 8 of the concrete 9 by the application of the equation (1) set forth above.

Lastly, the diameter d of the reinforcement bar is determined with the aid of equation (2) from the distance between the two maximum values, from the magnitude of one of the maximum values, for instance the value Max, and from the value H for the excitation field strength at the location of the reinforcement bar center derived from the calibration curve. By deducting one-half the value of the reinforcement bar diameter d from the value derived from equation (1), Yü is obtained by simple subtraction.

FIG. 7 schematically shows a sensing device 20 for determining the field generated by superimposition along the sensing path 10 on the surface 8 of the concrete.

The sensing device 20 includes a guide linkage 21 between the pole shoes 4 and 5 on which a probe holder or bracket 22 is mounted through the intermediary of sleeve bearings on the guide rods 21. Bracket 22 is longitudinally moveable between the pole shoes 4 and 5. The previously mentioned magnetic field probe 16 is mounted on the probe bracket 22 and is connected by electrical conductors (not illustrated) to the evaluating device described hereinafter.

The probe bracket 22 may be moved between the pole shoes 4 and 5 with the aid of a stepping motor 23, thus making it possible to address selective x-coordinates along the scanning path 10. To that end the shaft of the stepping motor 23 is connected with a worm shaft 24 so as to form a worm drive for the probe bracket 22. The respective positions of the magnetic field probe 16 between the pole shoes 4 and 5 derive from the geometry of the sensing device 20 and the stepping pulses fed to the stepping motor 23, each pulse rotating the stepping motor 23 by a constant stepping angle. The location of the magnetic field probe 16 relative to the shank of the yoke 2 results from the number of steps and the probe advance per step which, in turn, depends on the pitch of the worm shaft 24. The number of steps may be stored as a locus coordinate in the memory of an evaluating device, and it is also possible to use the individual stepping pulses for incrementing a memory address.

Figure 8:
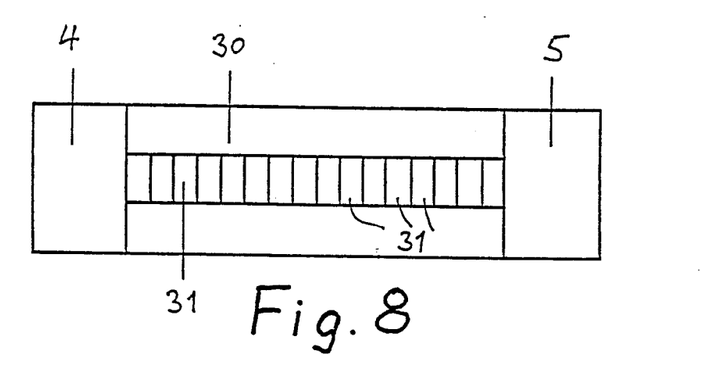
FIG. 8 is a plan view of a sensing device with a plurality of individual magnetic field probes arranged on a probe array carrier.

While FIG. 7 discloses a mechanically moveable sensing device, FIG. 8 discloses a sensing device 20 including a probe array carrier 30 having a plurality of individual magnetic field probes 31, each probe responding to the normal flux field component.

To determine the amplitude locus 17, the values transmitted by the individual magnetic field probes 31 may be fed to the input of the evaluating apparatus by electronic scanning and multiplexing techniques. In addition to sequentially scanning the individual magnetic field probes 31, it is also possible to determine and store all amplitude values in parallel fashion. In case of sequential scanning, the arrangement may be such that the clock pulses used for switching between individual magnetic field probes 31 are utilized for locus information, for instance with each clock pulse, a new address in the memory for the amplitude locus 17 may be accessed. It is also possible to transmit the clock pulses to a memory as a digital first signal with which the amplitude value is coordinated as a second digital signal.

The setup according to FIG. 8, including the closely adjacent individual magnetic field probes 31 for determining the normal components, avoids the disadvantages associated with the mechanical arrangement according to FIG. 7, such as the maintenance of mechanical parts and the inherent low speed of mechanical arrangements.

Figure 9:
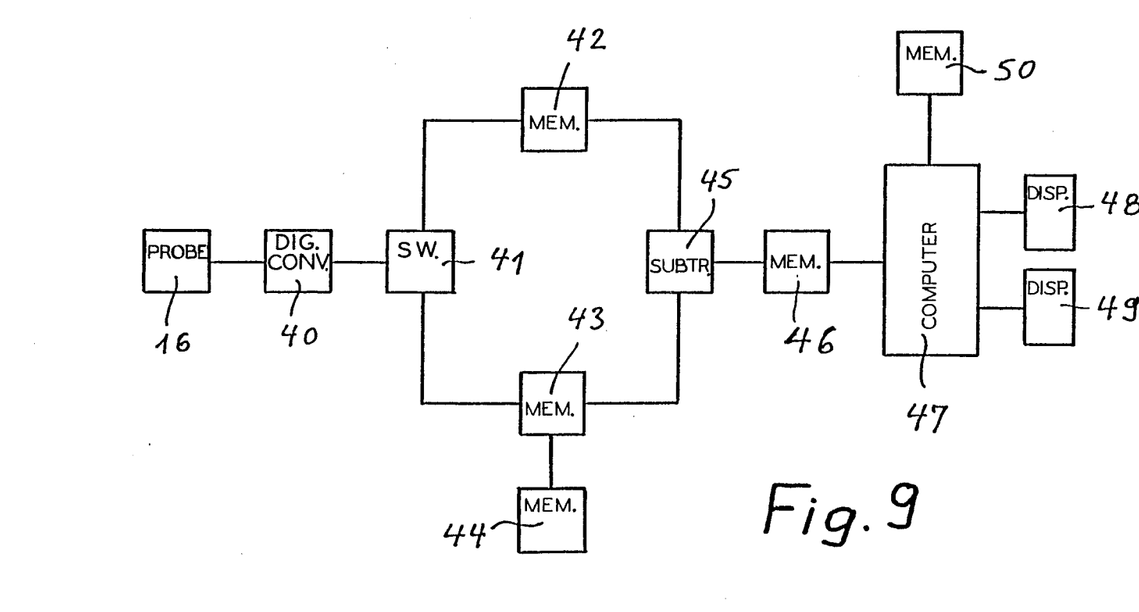
FIG. 9 is block diagram of an evaluating apparatus for use with the sensing device of FIG. 7.

FIG. 9 shows an evaluation apparatus for practicing the method disclosed hereinabove and for evaluating the signals transmitted by the sensing device 20 of FIG. 7. The magnetic field probe 16 of the sensing device 20 is connected with an analog/digital converter 40 which converts the analog values of the amplitude loci 11, 17 to corresponding digital values. The output of the analog/digital converter 40 is connected with an electronic switch 41. During the testing step I, with the yoke 2 lifted off concrete 9, the digitized signals of the magnetic field probe 16 proceed to a first memory 42. In the second testing step II, with the yoke set in place on concrete 9, the digitized signals from the magnetic field probe 16 proceed, by way of switch 41, to a second memory 43. The first memory 42 thus serves to store a plurality of scanning points of the amplitude locus 11, whereas the second memory 43 stores a plurality of loci on the amplitude curve 17. The stored values may represent the magnetic field normal components, whereas the x-coordinate values are stored in a further memory 44, or are fixed by addressing memories 42 and 43. In the latter case, the scanned ordinate values are sequentially stored in memories 42 and 43 with the locus information being determined by the respective addresses.

The outputs of the memories 42 and 43 are connected to the two inputs of a subtracting circuit 45. The latter circuit computes the difference between the amplitude locus 17 discussed above and the amplitude locus 11.

The output of the subtracting circuit 45 always includes the value of the difference locus 18, so that the entire difference locus 18 may be derived from the output of the subtracting circuit 45 by sequentially addressing the memories 42 and 43. The output of the subtracting circuit 45 is connected with a difference memory 46 for storing the difference locus 18.

An evaluation computer 47 has access to the difference memory 46 and, therefore, makes it possible to determine the diameter d of the reinforcement bar 14 and the overlayer dimension Yü with the aid of the above equations (1) and (2) from the data of the difference locus 18 stored in the difference memory 46. To that end, the maximum and minimum values of the difference locus 18 are first determined by the evaluation computer 47 while subsequently, after allowing for the locus coordinates which are either separately stored or determined by the address information, the distance Delta x between the maximum and the minimum values is determined.

The values computed by application of equations (1) and (2) are finally displayed respectively on a display 48 for the overlayer and on a display 49 for the bar diameter.

As shown in FIG. 9, a calibration memory 50 is coordinated with the evaluation computer 47, which calibration memory contains the field strengths H for the various distances of the reinforcement bar center after allowance for the current I and the individually applicable yoke geometry of the yoke 2.

Figure 10:
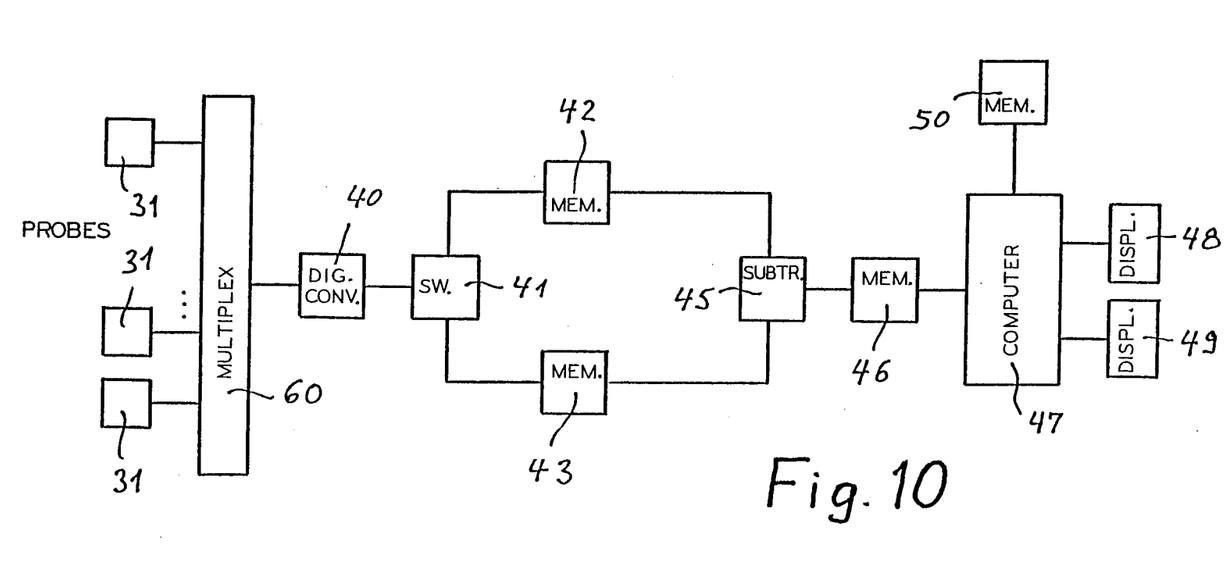
FIG. 10 is a block diagram of an evaluating apparatus for use with the sensing device of FIG. 8.

While FIG. 9 shows an evaluation apparatus for the scanner 20 of FIG. 7, FIG. 10 illustrates an evaluation device for a scanner 20 according to FIG. 8 with a probe array carrier 30 on which a plurality of individual magnetic probes 31 are arranged which may, for instance, be equally spaced.

The individual magnetic field probes 31 are connected with the inputs of a multiplexer 60 which sequentially connects the magnetic field probes 31 with the input of the analog/digital converter 40. Similarly as in the embodiment of FIG. 9, the analog/digital converter 40 is connected to an electronic switch 41. The normal magnetic field components sensed by the various magnetic field probes 31 in step I are routed by way of switch 41 to the first memory 42 and in the second testing step II to the second memory 43. The scanning path information is contained in the clock count of the multiplexer 60 which scans the individual magnetic field probes 31.

Similarly to the embodiment of FIG. 9, in the embodiment of FIG. 10 the outputs of the memories 42 and 43 are also connected with a difference memory 46 in which the scatter field locus $H_{NS}(x)$ and the difference locus 18 are respectively stored. After allowing for the field values H for the respective distances of the reinforcement bar centers from the surface 8 as stored in the calibration memory 50, the evaluation computer 47 performs an evaluation of the measured values contained in the difference memory 46, displaying the results on the display 48 for the overlayer and on the display 49 for the diameter d of the reinforcement bar 14.

Thus a method and apparatus for measuring the dimension of ferromagnetic objects in a nonmagnetic material such as concrete and for measuring the thickness of the overlayer has been provided.

While this invention has been described as having a preferred design, it will be understood that is capable of further modification. This Application is therefore intended to cover any variations, uses, or adaptions of the invention following the general principles thereof and including such departures from the present disclosure as come within known or customary practice in the art to which this invention pertains and fall within the limits of the appended claims.

What is claimed is:

1. A method for measuring ferromagnetic objects embedded in nonmagnetic material and the distance between the surface of said material and said objects by determining and evaluating the effect of the ferromagnetic objects on a magnetic field, the method comprising:

scanning a surface of a first layer of nonmagnetic material with a U-shaped electromagnet having two spaced apart poles, said nonmagnetic material having a ferromagnetic object embedded therein disposed between the poles of said U-shaped electromagnet, said scanning being conducted along a line interconnecting said spaced apart poles;

measuring and storing a first amplitude locus representing the normal components of the magnetic field oriented perpendicularly to said first surface between the pole of said magnet and along a line on said first surface which connects said poles;

scanning a second surface of material which is devoid of ferromagnetic objects;

measuring and storing amplitude locus representing the normal component of the magnetic field between the poles of the magnet along said second surface;

storing a calibration curve representing the exciting field strength between the poles as a function of the exciting current of said electromagnet;

determining a difference locus from said first and second amplitude loci;

calculating the distance between the center of the ferromagnetic object and the surface of the first layer of material from the distance between the maximum values of said difference locus;

calculating the diameter of said ferromagnetic object and the distance between the surface of said object and said first surface from the distance between said two maximum values, the amplitude of the magnetic field strength at one of said maximum values, and the exciting field strength derived from the calibration curve at the location of the object.

2. The method as set forth in claim 1 wherein said first layer of nonmagnetic material is concrete.

3. An apparatus for measuring the diameter of a ferromagnetic object embedded in a layer of concrete and the distance the object is spaced from the surface of said concrete, comprising:

a U-shaped ferromagnetic yoke (2) having two spaced apart pole shoes (4,5) adapted to be placed on a said layer of concrete with said pole shoes in contact with the surface (8) of said layer, the ferromagnetic object being disposed with its lengthwise axis arranged intermediate said pole shoes and transverse to a line connecting said pole shoes;

a direct current excitation coil (3) for carrying direct current mounted on said U-shaped yoke (2) to induce magnetic flux therein;

a sensor means (20) located between said pole shoes on the surface of the concrete layer for measuring the amplitude of the normal component of the magnetic field (6, 15) oriented perpendicularly to the surface (8) of said concrete layer between said pole shoes (4, 5) as a function of the distance between said pole shoes; and an evaluation means (40-60) for calculating the diameter of said ferromagnetic object and the distance between the surface of said concrete layer and said ferromagnetic object from the measurements of said sensor means by storing a first amplitude locus representing the normal components of the magnetic field measured by scanning with said sensor means the surface area between the pole shoes of said yoke of a layer of concrete having a ferromagnetic object embedded therein, storing a second amplitude locus representing the normal components of the magnetic field measured by scanning with said sensor means the surface area between the pole shoes of said yoke of a layer of concrete which is devoid of ferromagnetic objects, determining the different locus from said first and second loci and calculating the object diameter and the distance which the object is spaced from the surface of the concrete from the distance between the maximum and minimum values of said difference locus.

4. The apparatus as set forth in claim 3 wherein said evaluation means (40-60) includes an analog/digital converter (40) and sequentially addressable memories (42, 43, 46) for storing said first and second amplitude loci (11, 17, measured by said sensor (20).

5. The apparatus as set forth in claim 3 wherein said evaluation means (40-60) includes a subtraction circuit means (45) for calculating said difference locus (18) from said first amplitude locus (17) and said second amplitude locus (11).

6. The apparatus as set forth in claim 3 wherein said evaluation means (40-60) includes an analog/digital converter (40) and sequentially addressable memories (42, 43, 46) for storing said first, second, and difference amplitude loci (11, 17, 18), said evaluation means 40-60 further including a subtraction circuit means (45) for calculating said difference locus (18) from said first amplitude locus (17) and said second amplitude locus (11).

7. The apparatus as set forth in claim 4 where in the output of said subtraction circuit means (45) is connected to a difference locus memory (46) whose output is supplied to an arithmetic circuit (47) which is provided with input from a calibrating memory (50), said arithmetic circuit (47) determining the thickness of such concrete layer (9) and the diameter of a ferromagnetic object (14) by evaluating the difference locus (18) after allowing for the values derived from said calibrating memory (50).

8. The apparatus according to claim 5, including a display unit (48) for displaying the dimension of said concrete overlayer and a display unit (49) for displaying the diameter of the ferromagnetic object, said display unit 48 and display unit 49 being connected to said arithmetic circuit (47).

9. The apparatus as set forth in claim 3 including a probe holder (22) having a magnetic field probe (16) secured thereon, said probe holder being mounted on a guide linkage (21) which extends between the pole shoes (4, 5), said guide linkage adapted to be moved by a worm drive (24) which is driven by a stepping motor (23).

10. The apparatus as set forth in claim 3, wherein a probe array carrier (30) is provided between said pole shoes (4, 5), said carrier including a linear arrangement of individual magnetic field probes (31) whose output signals may be scanned.

11. The apparatus as set forth in claim 7 wherein the magnetic field pattern sensed by the magnetic field probes (31) is determined by the sequential storage of a plurality of digitized individual values of the magnetic field pattern (6, 11, 17, 18).

12. The apparatus as set forth in claim 3, wherein a probe array carrier (30) is provided between said pole shoes (4, 5), said carrier including a linear arrangement of individual magnetic field probes (31) whose output signals may be scanned, the magnetic field pattern sensed by said magnetic field probes (31) being determined by the sequential storage of plurality of digitized individual values of the magnetic field pattern (6, 11, 17, 18).

13. The apparatus as set forth in claim 3, wherein the spacing between said pole shoes (4, 5) is adjustable.

* * * * *

UNITED STATES PATENT AND TRADEMARK OFFICE
CERTIFICATE OF CORRECTION

PATENT NO. : 4,837,509
DATED : June 6, 1989
INVENTOR(S) : Gerd Dobmann

It is certified that error appears in the above-identified patent and that said Letters Patent is hereby corrected as shown below:

Col. 4, line 41, after "of" delete "on";

Claim 4, Col. 9, line 30, after "17," insert --18)--.

Signed and Sealed this

Tenth Day of April, 1990

Attest:

HARRY F. MANBECK, JR.

*Attesting Officer*     *Commissioner of Patents and Trademarks*